(12) United States Patent
Zimmer et al.

(10) Patent No.: US 8,522,236 B2
(45) Date of Patent: Aug. 27, 2013

(54) METHOD AND SYSTEM FOR ESTABLISHING A ROBUST VIRTUALIZED ENVIRONMENT

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 1222 days.

(21) Appl. No.: 11/966,102

(22) Filed: Dec. 28, 2007

(65) Prior Publication Data

US 2009/0172661 A1 Jul. 2, 2009

(51) Int. Cl.
*G06F 9/455* (2006.01)

(52) U.S. Cl.
USPC .............................................. 718/1

(58) Field of Classification Search
None
See application file for complete search history.

(56) References Cited

U.S. PATENT DOCUMENTS

| | | | |
|---|---|---|---|
| 6,075,938 A | 6/2000 | Bugnion et al. | |
| 6,848,046 B2 | 1/2005 | Zimmer | |
| 7,103,529 B2 | 9/2006 | Zimmer | |
| 7,376,949 B2* | 5/2008 | Lowell et al. | 718/1 |
| 7,555,566 B2* | 6/2009 | Blumrich et al. | 709/249 |
| 7,581,219 B2* | 8/2009 | Neiger et al. | 718/1 |
| 7,757,231 B2* | 7/2010 | Anderson et al. | 718/1 |
| 7,802,050 B2* | 9/2010 | Savagaonkar et al. | 711/6 |
| 7,865,893 B1* | 1/2011 | Omelyanchuk et al. | 718/1 |
| 7,913,226 B2* | 3/2011 | Lowell et al. | 717/120 |
| 7,941,810 B2* | 5/2011 | Khanna et al. | 719/318 |
| 8,099,574 B2* | 1/2012 | Savagaonkar et al. | 711/163 |
| 2004/0103299 A1* | 5/2004 | Zimmer et al. | 713/200 |
| 2004/0268135 A1* | 12/2004 | Zimmer et al. | 713/189 |
| 2006/0070066 A1* | 3/2006 | Grobman | 718/1 |
| 2006/0130060 A1* | 6/2006 | Anderson et al. | 718/1 |
| 2006/0161719 A1* | 7/2006 | Bennett et al. | 711/6 |
| 2007/0028238 A1* | 2/2007 | Bennett et al. | 718/1 |
| 2008/0163256 A1* | 7/2008 | Khanna et al. | 719/318 |

FOREIGN PATENT DOCUMENTS

| | | |
|---|---|---|
| DE | 19946959 A1 | 4/2001 |
| EP | 0924610 A2 | 6/1999 |
| EP | 0924610 A3 | 6/1999 |
| WO | 02/93375 A2 | 5/2002 |
| WO | 02/052404 A2 | 7/2002 |

OTHER PUBLICATIONS

Joanna Rutkowska et al., "Blue Pill Project", www.bluepillproject.org, 2007.
Joanna Rutkowska, "Blue Pill (malware)", http://en.wikipedia.org/wiki/Blue_Pill_%28malware%29, Feb. 23, 2008.
Intel Corporation: "IA-64 System Abstraction Layer Specification" On Line Manual, Jan. 2000, XP002253057.

(Continued)

*Primary Examiner* — Emerson Puente
*Assistant Examiner* — Hiren Patel
(74) *Attorney, Agent, or Firm* — Barnes & Thornburg LLP

(57) ABSTRACT

A method and system for establishing a virtualized environment includes booting a first virtual machine monitor to establish a first virtual machine and booting a second virtual machine monitor in the first virtual machine. The first and second virtual machine monitors may be hypervisors. The method may also include directing management interrupts, such as system management interrupts and/or platform management interrupts, to the first virtual machine monitor.

15 Claims, 4 Drawing Sheets

(56) References Cited

OTHER PUBLICATIONS

Souder, et al., "A Tool for Securley Integrating Legacy Systems into a Distributed Environment", Reverse Engineering, 1999, (Abstract provided).
Intel Corporation: "Extensible Firmware Interface Specification—version 1.02 Chapters 1, 16, 17" On Line Specification, (Dec. 12, 2000), XP002253059.
Ebicoglu, K. et al., "IBM Research Report—DAISY: Dynamic Compilation for 100% Architectural Compatibility," Computer Science, May 8, 1996. http://citeseer.ist.psu.edu/2006.html.
Brackin, S. H., "An Interface Specification Language for Automatically Analyzing Cryptographic Protocols," Proceedings., 1997 Symposium on San Diego, CA, USA, Feb. 10-11, 1997, pp. 40-51.
Devanbu, P. T. et al., "Techniques for Trusted Software Engineering," Proceedings of the 1998 International Conference on Kyoto, Japan, Apr. 19-25, 1998, pp. 126-135.
Ebcioglu, K. et al., "An Eight-Issue Tree-VLIW Processor for Dynamic Binary Translation," Sep. 16, 1998. http://www.research.ibm.com/vliw/isca3l/An%20eightissue%20tree-VLIW%20processor%20for%20dynamic%20binary%2Otranslation.pdf.
Robin, J. S. et al., "Analysis of the Intel Pentium's Ability to Support a Secure Virtual Machine Monitor," Jun. 11, 2000. http://citeseer.ist.psu.edu/robin00analysis.html.
U.S. Appl. No. 11/601,321, filed Nov. 16, 2006, entitled "Methods and Apparatus for Defeating Malware," by Vincent J. Zimmer, etal.
Popek, et al., "Formal Requirements for Virtualizable Third Generation Architectures", Communications of the ACM, vol. 16, No. 7, Jul. 1974 (Abstract provided).
Neiger et al., "Intel Virtualization Technology: Hardware Support for Efficient Processor Virtualization," Intel Technology Journal, vol. 10, issue 3, 2006, 14 pages.

\* cited by examiner

METHOD AND SYSTEM FOR ESTABLISHING A ROBUST VIRTUALIZED ENVIRONMENT

BACKGROUND

Virtual machine monitors (VMMs) are software virtualized platforms that allow multiple guest operating systems and/or other applications to run concurrently on the same host computing device. Some virtual machine monitors are designed to be executed over an operating system, are robust, and include many features. Such virtual machine monitors are commonly known as type-2 virtual machine monitors. Other virtual machine monitors are designed to be executed directly on the hardware platform of the computing device and include few features such as diagnostic capabilities. Such virtual machine monitors are commonly known as type-1 virtual machine monitors or hypervisors. Because hypervisors are typically designed to be "thin," non-platform specific, and include few features, the hypervisors provide few resources for error handling. Additionally, in some applications, the system management mode, which typically handles management interrupts, may be disabled, removed, or simply not available.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION OF THE DRAWINGS

Figure 1:
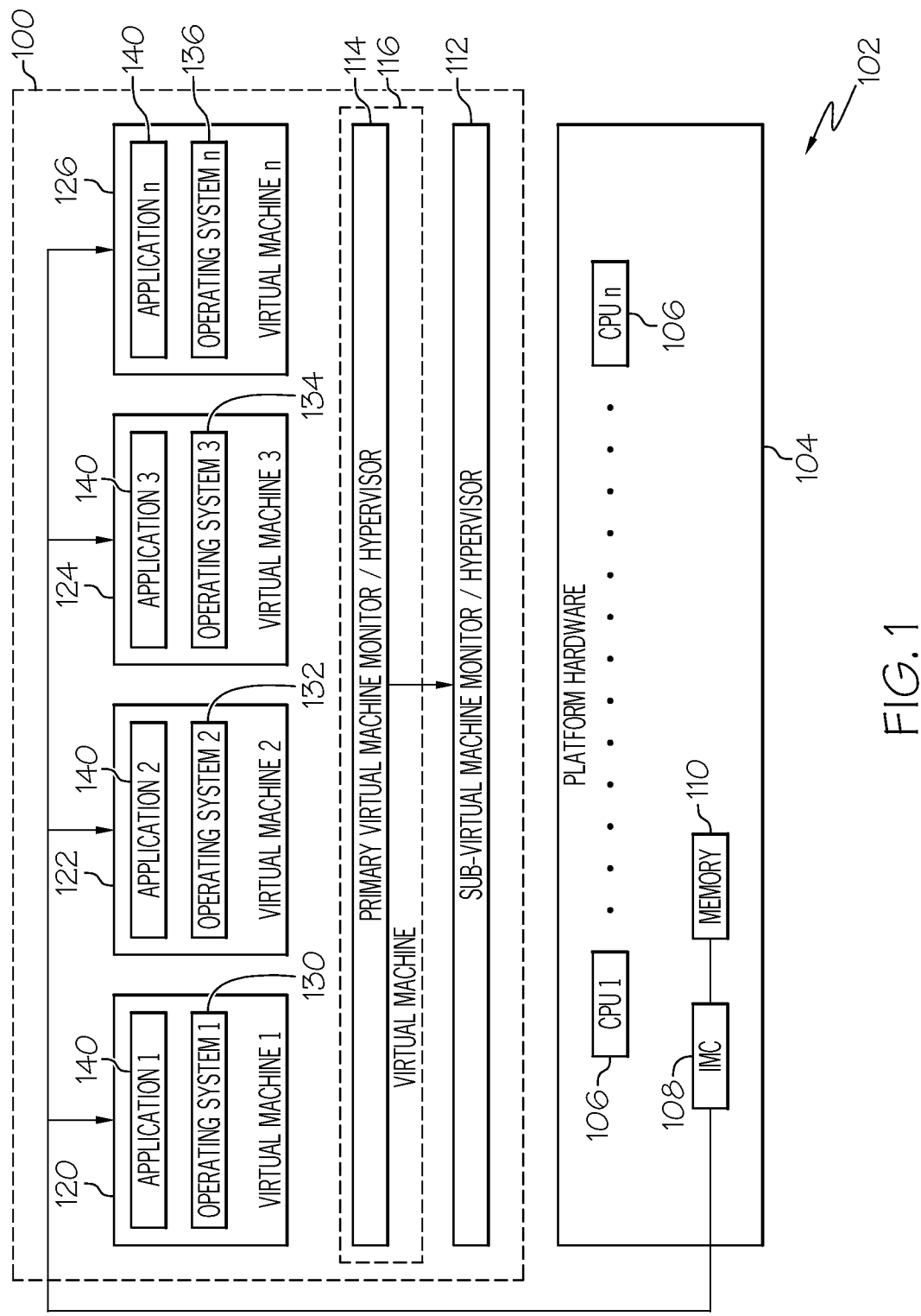
FIG. 1 is a simplified block diagram of a virtualized environment established on a computing device.
Figure 2:
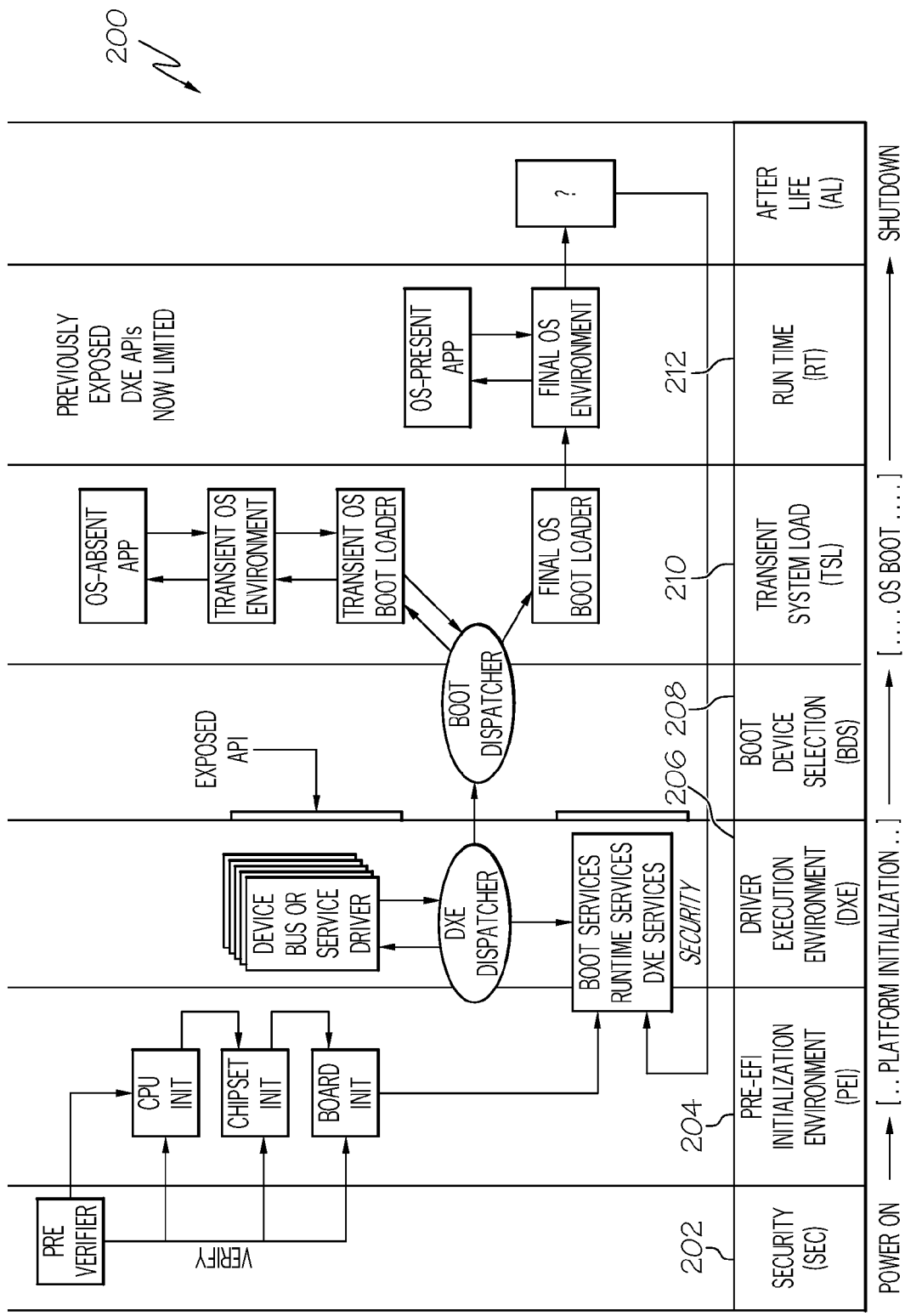
FIG. 2 is a simplified boot timeline of the computing device of FIG. 1.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present disclosure. It will be appreciated, however, by one skilled in the art that embodiments of the disclosure may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Referring now to FIG. 1, in one embodiment, a virtualized environment 100 is established on a computing device 102. The computing device 101 may be embodied as any type of computing device such as, for example, a desktop computer system, a laptop computer system, a server or enterprise computer system, or a handheld computing device. The computing device 102 includes platform hardware 104. The platform hardware 104 includes one or more central processing units (CPU) 106, an integrated memory controller (IMC) 108; and memory 110, which may be embodied as any one or more memory devices of one or more types (e.g., read only memory, random access memory, etc.). In addition to the central processing units 106, integrated memory controller 108, and memory 110, the platform hardware 104 may include additional devices or structures. For example, any one or more of the central processing units 106 may include one or more processor cores. Additionally, the platform hardware 106 may include an input/output controller hub and/or other devices. As such, it should be appreciated that the computing device 102 may include a number of additional structures and devices, which are not shown in FIG. 1 for clarity of the description.

The illustrative virtualized environment 100 includes a plurality of virtual machine monitors. In particular, the virtualized environment 100 includes a first or sub-virtual machine monitor 112 and a second or primary virtual machine monitor 114. The primary virtual machine monitor 114 is executed on the sub-virtual machine monitor 112. That is, the sub-virtual machine monitor 112 establishes a virtual machine 116 on which the primary virtual machine monitor 114 is executed.

The virtual machine monitors are illustratively type-1 virtual machine monitors, commonly known as hypervisors, but may be type-2 virtual machine monitors in other embodiments. As such, the primary hypervisor 114 may be any type of hypervisor. In one particular embodiment, the primary hypervisor 114 has a "thin" configuration with few resources for error handling. Additionally, the primary hypervisor 114 may be a universal, non-platform specific, or otherwise be configured to operate on one of a number of different platforms. Similarly, the sub-hypervisor 112 may also be configured to be "thin, but may include additional features relative to the primary hypervisor 112 and/or be platform specific. As such, the sub-hypervisor 112 forms an interface between the hypervisor 114 and the platform hardware 104. As discussed in more detail below, the sub-hypervisor 112 is configured to handle management interrupts, such as platform management interrupts (PMIs) and/or system management interrupts (SMIs).

A plurality of virtual machines 120 may be executed on the primary hypervisor 114. For example, in the embodiment illustrated in FIG. 1, a virtual machine 120, a virtual machine 122, a virtual machine 124, and a virtual machine 126 are each contemporaneously executed on the primary hypervisor 114. Each of the virtual machine instances 120, 122, 124, 126 may execute an operating system 130, 132, 134, 136, respectively. The operating systems 130, 132, 134, 136 may be similar or different operating systems. For example, the operating system 130 may be a WINDOWS operating system, which is commercially available from MicroSoft Corporation of Redmond, Wash., and the operating system 132 may be a LINUX operating system, which is commercially available from one of a number of vendors such as Red Hat of Raleigh, N.C. Each of the operating systems 130, 132, 134, 136 may execute one or more applications 140. Each of the applications 140 may be similar or different based on the type of respective operating system 130, 132, 134, 136, the intended use of the respective virtual machine 120, 122, 124, 126, and/or other criteria. It should be appreciated that although only four virtual machines 120, 122, 124, 126 are illustrated in FIG. 1, the virtual environment 100 may include greater or fewer virtual machines in other embodiments. Additionally, although only one primary hypervisor 114 is illustrated in FIG. 1, additionally hypervisors may be executed on the sub-hypervisor 112 and/or on the primary hyper visor 114 in other embodiments. In this way, a level of recursive virtualization may be established.

The primary hypervisor 114 translates operations of each operating system 130, 132, 134, 136 executed on each virtual machine 120, 122, 124, 126 to provide a level of abstraction between the operating system 130, 132, 134, 136 and the platform hardware 104. The sub-hypervisor 112 similarly translates the operations of the primary hypervisor 114 to provide a further level of abstraction between the primary hypervisor 114 and the platform hardware 104. In embodiments wherein the sub-hypervisor 112 is platform-specific, the sub-hypervisor 112 may translate all or a portion of the operations of the primary hypervisor 114 to platform-specific instructions. As such, because the sub-hypervisor 112 is platform-specific, a more robust virtualized environment may be established relative to virtualized embodiments utilizing a single non-platform specific hypervisor. For example, the sub-hypervisor 112 may virtualize memory for the primary hypervisor 114 and virtual machines 120, 122, 124, 126 using Extended Page Tables. In such embodiments, the sub-hypervisor 112 may employ sub-Extended Page Tables to facilitate the Extended Page Tables of the primary hypervisor 114. That is, a portion of the memory 110 (i.e., a reserved memory region) and/or other resources may be sequestered by the sub-hypervisor 112 to establish the virtual environment 100. The reserved memory region may be sequestered from the primary hypervisor 114 prior to the booting of the primary hypervisor 114. As such, each virtual machine 120, 122, 124, 126 may have access to a separate, virtualized memory section of the memory 110 via the integrated memory controller 108.

During use, as discussed in more detail below in regard to FIG. 3, the sub-hypervisor 112 is configured to provide a level of abstraction between the primary hypervisor 114 and the platform hardware 104. In addition, the sub-hypervisor 112 is configured to handle any management interrupts that are generated during operation of the computing device 100. For example, during the boot process of the computing device 100, a software trap may be established to direct any platform management interrupt (PMI) or a system management interrupt (SMI) to the sub-hypervisor 112. In response, the sub-hypervisor may respond to the interrupt. In some embodiments, the sub-hypervisor may handle the management interrupt without disturbing the operation of the primary hypervisor 114. If, however, the primary hypervisor needs to handle the management interrupt or otherwise take some action in response to the management interrupt, the sub-hypervisor 112 may provide the interrupt to the primary hypervisor 114 or generate a new interrupt to cause the primary hypervisor 114 to respond accordingly. Additionally or alternatively, the sub-hypervisor 112 may be designed to handle other or additional operations. For example, in some embodiments, the sub-hypervisor 112 may be configured to handle power management of the computing device 100 or provide certain services such as selected input/output services.

The sub-hypervisor 112 is booted prior to the primary hypervisor 114. For example, an illustrative boot timeline 200 of the computing device 100 is illustrated. The boot timeline 200 includes a plurality of boot phases. For example, when the computing device 100 is initially powered on, a security phase 202 is executed. Subsequently, a pre-Extended Firmware Interface Initialization Environment (PEI) phase 204 is executed in which devices of the platform hardware 104, such as the central processing units 106, are initialized. Next, a driver execution environment (DXE) phase 206 is executed in which a plurality of device, bus, and/or service drivers are loaded and/or executed. In the illustrative embodiment, the sub-hypervisor 112 is loaded and executed during or at the completion of the driver execution environment phase 206. For example, a set of firmware instructions may be executed to boot the sub-hypervisor 112. In some embodiments, the sub-hypervisor 112 may be booted using an Authenticated Code Module (ACM) to ensure the sub-hypervisor 112 that is to be executed on the computing device 102 is an authorized hypervisor, is an authorized version, from an authorized vendor, and/or the like. A Boot Device Selection (BDS) phase 208 is executed after the driver execution environment phase 206. Subsequently, a Transient System Load (TSL) phase 210 is executed in which an operating system loader is initiated. The operating system(s) are loaded and executed in the Run Time (RT) phase 212. The primary hypervisor 114 is loaded and executed during the Run Time phase 212. Additionally, the virtual machines 120, 122, 124, 126 may be established in the Run Time phase 212.

Figure 3A:
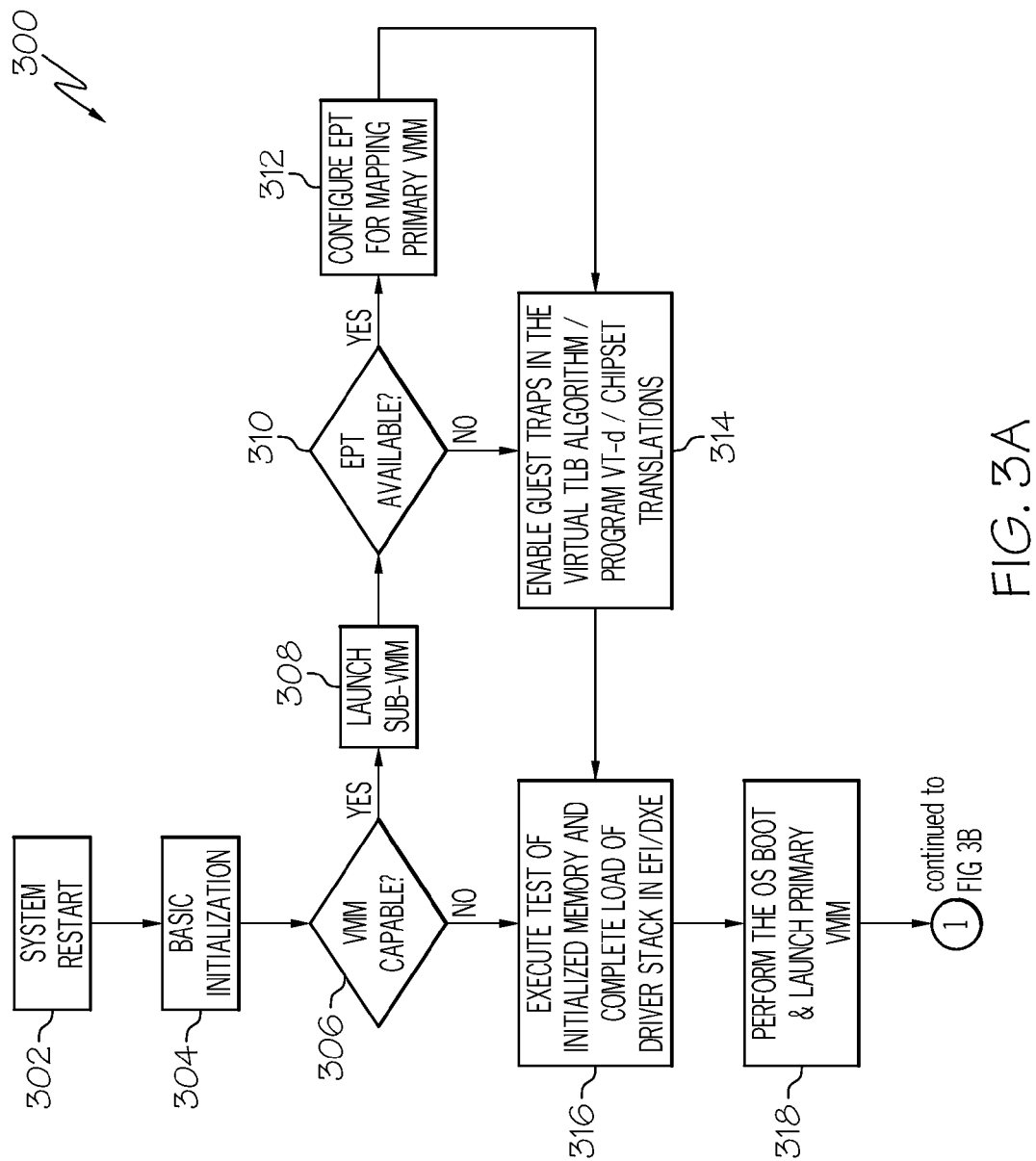
FIG. 3 is simplified algorithm for establishing a virtualized environment.
Figure 3B:
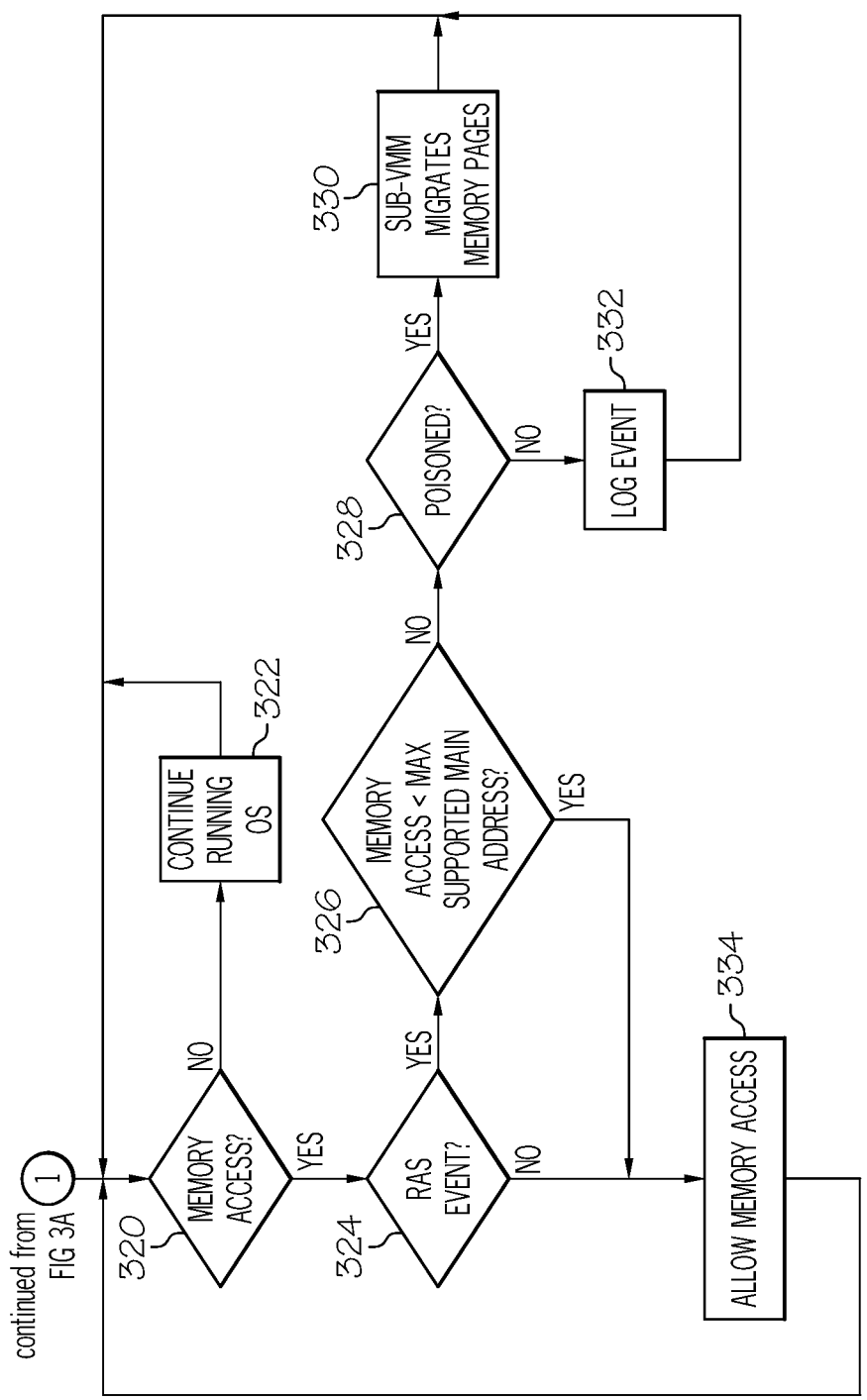

Referring now to FIG. 3, an algorithm 300 for providing a virtualized environment may be used by the computing device 100. In such a virtualized environment, a sub-hypervisor is used to respond to management interrupts and/or other predetermined errors as discussed below. The algorithm 300 includes a block 302 in which a system restart operation is detected by the computing device 100. In block 304, basic initialization of the platform hardware 104. For example, the central processing units 106 and memory 110 may be initialized.

In block 306, it is determined whether the platform hardware 104 is capable of hosting a virtual machine monitor. If so, the sub-virtual machine monitor or sub-hypervisor 112 is launched in block 308. In block 310, it is determined whether Extended Page Tables are available. If so, the Extended Page Tables are configured in block 312 for the memory mapping of the primary virtual machine monitor or hypervisor 114. As discussed above, a shadowed or sub-Extended Page Table may be used by the sub-hypervisor 112, which is unavailable to the primary hypervisor 114.

In block 314, virtual-to-physical memory translations are configured. For example, guest traps may be established in the virtual translation look-aside buffer (TLB). Additionally, chipset translations may be programmed in block 314. The memory 110 of the platform hardware 104 of the computing device 102 is tested and the driver stack is loaded in block 316. The primary hypervisor 114 is launched in block 318. Additionally, one or more virtual machines 120, 122, 124, 126 may be established on the primary hypervisor 114 in block 318.

In block 320, it is determined if a memory access has been requested by the primary hypervisor 114. Such a memory access request may be generated by, for example, an operating system being executed on one of the virtual machines 120, 122, 124, 126. If not, the primary hypervisor 114 and operating systems 130, 132, 134, 136 continue operation in block 322. However, if a memory access was requested in Block 320, it is determined if such a memory request is a reliability, availability, serviceability (RAS) event in block 324. An RAS event may be defined as any event that is of significance to the reliability or security of the computing device 100.

If the memory access request is determined to be an RAS event in block 324, it is determined whether the requested memory access is less than the maximum supported main address in block 322. If so, the memory access is allowed in block 334. However, if the memory access is greater than the maximum supported main address, it is determined whether the memory is erroneous or "poisoned" in block 328. In some embodiments, the memory can be determined to be "poisoned" if there is a single bit error (SBE) or multi-bit error (MBE) in the DRAM. Conventionally, such error events often signal a system management interrupt (SMI) or a platform management interrupt (PMI) from the memory controller.

If it is determined that the memory is erroneous or "poisoned," the sub-hypervisor 112 responds in block 330 by migrating the memory pages to a reserved memory region that has been sequestered from the primary hypervisor 114 or performing a "scrub" (clearing of the error syndrome bits). Such transparent recovery of memory may increase the Mean Time Between Failure (MTBF) and/or Mean Time To Failure (MTTF) of the system memory complex. If memory is not erroneous or "poisoned" (e.g., the non-recoverable multi-bit error), the security event in logged in block 332. Regardless, the algorithm 300 loops back to block 320 wherein it is determined if another memory access has occurred and the primary hypervisor 114 and operating systems 130, 132, 134, 136 continue execution. It should be appreciated that in other embodiments, the sub-hypervisor 112 may be designed to respond to other types of errors or security events in addition to or alternatively to memory access events.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

What is claimed is:

1. A method comprising:
executing firmware instructions to boot a first virtual machine monitor, the firmware instructions to execute during a boot phase and prior to a run time phase;
establishing a first virtual machine using the first virtual machine monitor;
booting a second virtual machine monitor in the first virtual machine during the run time phase;
establishing a second virtual machine using the second virtual machine monitor;
establishing a software trap to direct all management interrupts to the first virtual machine monitor, the management interrupts including at least one reliability, availability, and serviceability (RAS) event;
determining, in response to receiving a management interrupt with the first virtual machine monitor, whether the second virtual machine monitor or the first virtual machine monitor needs to handle the received management interrupt;
providing the received management interrupt to the second virtual machine monitor in response to determining that the second virtual machine monitor needs to handle the received management interrupt; and
responding to the at least one RAS event with the first virtual machine monitor in response to determining that the first virtual machine monitor needs to handle the received management interrupt by (i) performing a page migration by the first virtual machine monitor to a reserved memory region that has been sequestered from the second virtual machine monitor and (ii) translating a guest-physical memory address associated with the second virtual machine monitor to a host-physical memory address associated with the first virtual machine monitor using Extended Page Tables (EPT).

2. The method of claim 1, wherein the first virtual machine monitor is a hypervisor.

3. The method of claim 2, wherein the second virtual machine monitor is a hypervisor.

4. The method of claim 1, wherein the management interrupts include at least one of a system management interrupt and a platform management interrupt.

5. The method of claim 1, wherein the first virtual machine monitor is a platform-specific virtual machine monitor.

6. The method of claim 1, wherein executing firmware instructions to boot the first virtual machine monitor comprises booting the first virtual machine monitor using an authenticated code module.

7. The method of claim 1, further comprising providing the management interrupt to the second virtual machine monitor.

8. A method comprising:
executing firmware instructions of a platform including one or more hardware virtualization extensions to boot a platform-specific virtual machine monitor, the firmware instructions to execute during a boot phase of the platform and prior to a run time phase of the platform;
establishing a first virtual machine using the platform-specific virtual machine monitor;
booting a non-platform-specific virtual machine monitor in the first virtual machine during the run time phase of the platform;
establishing a second virtual machine using the non-platform-specific virtual machine monitor;
directing all management interrupts to the platform-specific virtual machine monitor, the management interrupts including at least one reliability, availability, and serviceability (RAS) event;
determining, in response to receiving a management interrupt with the platform-specific virtual machine monitor, whether the non-platform-specific virtual machine monitor or the platform-specific virtual machine monitor needs to handle the received management interrupt;
generating, in response to determining that the non-platform-specific virtual machine needs to handle the received management interrupt, a new interrupt to cause the non-platform-specific virtual machine monitor to respond to the received management interrupt; and responding to the at least one RAS event with the first virtual machine monitor in response to determining that the platform-specific virtual machine monitor needs to handle the received management interrupt by (i) performing a page migration by the platform-specific virtual machine monitor to a reserved memory region that has been sequestered from the non-platform-specific virtual machine monitor and (ii) translating a guest-physical memory address associated with the non-platform-specific virtual machine monitor to a host-physical memory address associated with the platform-specific virtual machine monitor using Extended Page Tables (EPT).

9. The method of claim 8, wherein each of the platform-specific virtual machine monitor and the non-platform-specific virtual machine monitor is a hypervisor.

10. The method of claim 8, wherein the management interrupts include at least one of a system management interrupt and a platform management interrupt.

11. The method of claim 8, wherein executing firmware instructions of a platform to boot a platform-specific virtual machine monitor comprises booting the platform-specific virtual machine monitor using an authenticated code module.

12. The method of claim 8, wherein the platform-specific virtual machine monitor delivers the management interrupt to the non-platform-specific virtual machine monitor.

13. A computing device comprising:
a processor including one or more hardware virtualization extensions; and
a memory device having stored therein a plurality of instructions, which when executed by the processor, cause the processor to:
boot a first hypervisor during a boot phase of the computing device and prior to a run time phase of the computing device;
virtualize a second hypervisor using the first hypervisor during the run time phase of the computing device;
establish a software trap to direct all management interrupts to the first hypervisor, the management interrupts including at least one reliability, availability, and serviceability (RAS) event;
determine, in response to receiving a management interrupt with the first hypervisor, whether the second hypervisor or the first hypervisor needs to handle the received management interrupt;
generate, in response to determining that the second hypervisor needs to handle the received management interrupt, a new interrupt to cause the second hypervisor to respond to the received management interrupt; and
respond to the at least one RAS event with the first hypervisor to (i) perform a page migration to a reserved memory region that has been sequestered from the second hypervisor prior to the booting of the second hypervisor and (ii) translate a guest-physical memory address associated with the second hypervisor to a host-physical memory address associated with the first hypervisor using Extended Page Tables (EPT), in response to determining that the first hypervisor needs to handle the received management interrupt.

14. The computing device of claim 13, wherein the first hypervisor is a platform-specific hypervisor and the second hypervisor is a non-platform specific hypervisor.

15. The computing device of claim 13, wherein to boot the first hypervisor comprises to boot the first hypervisor using an authenticated code module.

* * * * *